D. CROWELL.
Mowing-Machine.

No. 212,198.            Patented Feb. 11, 1879.

WITNESSES:
Henry N. Miller
C. Sedgwick

INVENTOR:
D. Crowell
BY Munn & Co
ATTORNEYS.

UNITED STATES PATENT OFFICE.

DAVID CROWELL, OF FLORENCE, ONTARIO, CANADA, ASSIGNOR TO HIMSELF AND JAMES GREY, OF SAME PLACE.

IMPROVEMENT IN MOWING-MACHINES.

Specification forming part of Letters Patent No. 212,198, dated February 11, 1879; application filed November 22, 1878.

*To all whom it may concern:*

Figure 1:
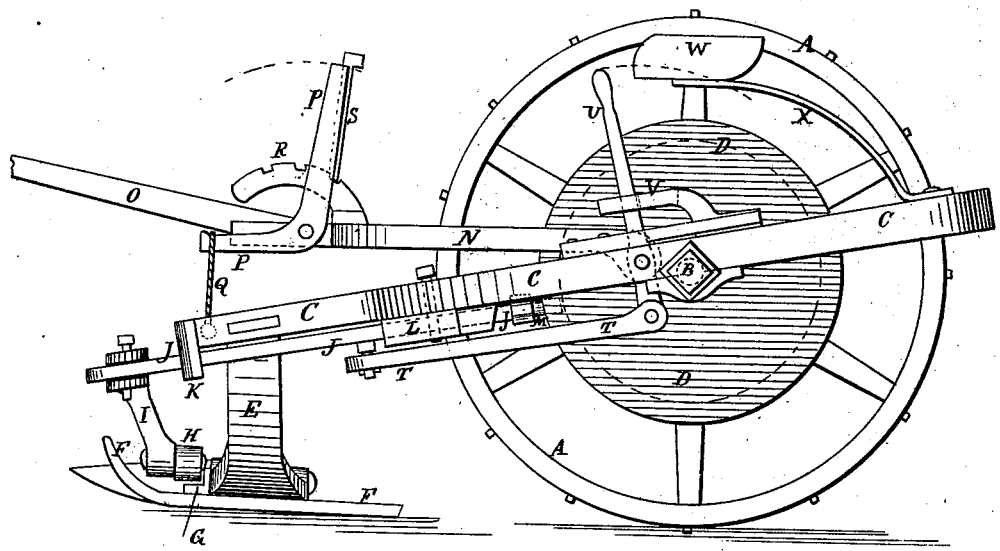
Figure 2:
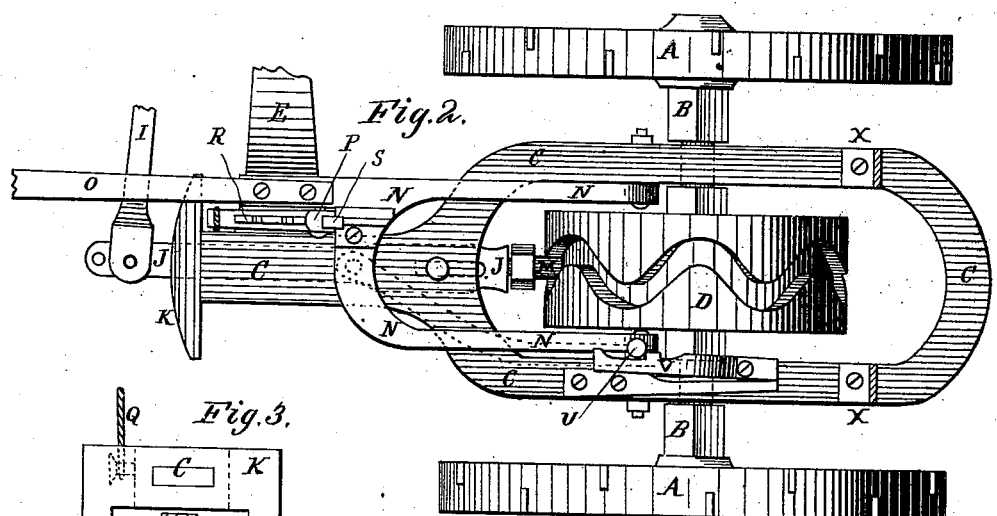
Figure 3:
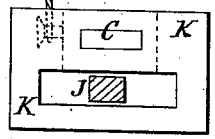
Figure 4:
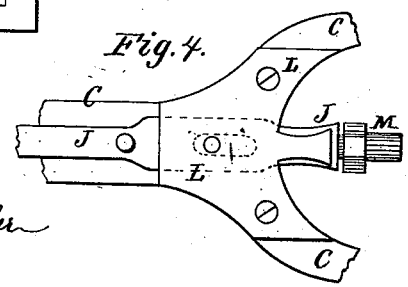

Be it known that I, DAVID CROWELL, of Florence, in the county of Bothwell, Province of Ontario, and Dominion of Canada, have invented a new and useful Improvement in Mowing-Machines, of which the following is a specification:

Figure 1 is a side view of my improved machine, one of the wheels being removed. Fig. 2 is a top view of the same. Fig. 3 is a detail view of the forward end of the frame. Fig. 4 is a detail under-side view of a part of the frame.

Similar letters of reference indicate corresponding parts.

The object of this invention is to furnish an improved mowing-machine which shall be simple in construction, of light draft, easily controlled, and effective in operation.

A are the wheels, which are rigidly attached to the axle B, so as to carry the said axle with them in their revolution. The faces of the wheels A are provided with corrugations or teeth to prevent them from slipping upon the ground.

The axle B revolves in bearings in the frame C, and to its center is attached a large wheel, D, provided with a deep zigzag groove in its face. The forward part of the frame C is made narrow, and to its side is rigidly attached the upper end of an arm, E.

The arm E is curved downward, outward, and forward, and its lower end is forked, and has eyes formed through it to receive the bolt by which the shoe F and the cutter-bar G are hinged to it. The shoe F is made wide and flat, and has its forward end curved upward, so that it may pass over the ground easily. The cutter-bar G is rigidly attached to the shoe F.

H is the sickle-bar, which is connected with the cutter-bar G in the usual way, and in its inner end is formed an eye to receive the bolt by means of which it is hinged to an eye formed in the outer end of the connecting-bar I. The inner end of the connecting-bar I is slotted to receive the forward end of the bar J, and has a hole formed through it to receive the pin or bolt by means of which it is pivoted to the said bar J. The forward end of the bar J has several holes formed through it to receive the pivoting pin or bolt, so that the stroke of the sickle-bar H can be regulated as may be required.

The bar J passes through a horizontal slot in the lower part of the plate K, attached to the forward end of the frame C, and the lower part of which projects below the said frame C. The bar J passes along the lower side of the frame C, and through a keeper or guide-block, L, attached to the lower side of the said frame, and the cavity of which is made of such a size as to allow the said bar J to vibrate freely. The bar J is pivoted to the frame C and to the keeper L, and is slotted longitudinally to receive the pivoting pin or bolt and allow it to have the necessary play. The rear end of the bar J enters the zigzag groove of the wheel D, so that the said bar J, and through it the sickle-bar H, may be vibrated by the advance of the machine. The friction between the end of the bar J and the sides of the zigzag groove in the wheel D may be lessened by the tubular washer M, placed upon the end of the said bar J.

To the side bars of the frame C, a little in front of the axle B, are pivoted the end of the U-bar or frame N. One arm of the frame N is extended forward to form the tongue O; or, if desired, the tongue O may be made separate and rigidly attached to the bend of the frame N in line with one of its arms.

To the forward end of the frame N is pivoted the angle of an elbow-lever, P, the end of the lower arm of which is connected with the forward end of the frame C by a short chain or rope, Q, so that the cutter-bar may be adjusted to work at any desired distance above the ground, and may be raised for passing from place to place by operating the said lever P.

The lever P is slotted to receive the curved arm R, the rear end of which is rigidly attached to the forward end of the frame N, and its upper or convexed edge is notched to receive the lower end of the bolt or bar S. The bar or bolt S slides in a longitudinal groove in the rear edge of the lever P, or in a keeper attached to the said edge, so that it may be drawn up to allow the lever P to move along the arm R, and pushed down to engage with the notches of the said arm R, and thus lock the cutter-bar in any position into which it may be adjusted.

To the middle part of the vibrating bar J is pivoted the forward end of a connecting-bar, T, the rear end of which is pivoted to the lower end of the lever U. The lever U, at a little distance from its lower end, is pivoted to a side bar of the frame C by one of the bolts that pivot the frame N to the said frame C, or by a separate bolt, so that by operating the said lever the vibrating bar J may be slid longitudinally to throw its rear end into, and withdraw it from, the zigzag groove of the wheel D. The lever U is locked to hold the bar J in either position by entering one or the other of the notches in the side of the arm V, along which the said lever U moves, and which is rigidly attached to the frame C.

W is the driver's seat, which is placed over the wheel D, and is attached to the upper end of the curved spring-frame X. The lower end of the curved spring-frame X is attached to the rear part of the frame C.

Having thus described my invention, I claim as new and desire to secure by Letters Patent—

The hinged sickle-bar, combined with the hinged slotted bar I, the pivoted bar J, the horizontally-slotted plate K, the hollow slotted guide-block L, and the cam-wheel D on axle, as and for the purpose set forth.

DAVID CROWELL.

Witnesses:
  ALBERT BECK,
  D. McCRANEY.